United States Patent
Adachi et al.

[11] Patent Number: 5,993,169
[45] Date of Patent: Nov. 30, 1999

[54] OIL PRESSURE GENERATOR HAVING AT LEAST TWO COAXIAL ROTATING POWER SOURCES AND POWER OUTPUT APPARATUS

[75] Inventors: Masatoshi Adachi; Ryuji Ibaraki; Hiroshi Hata; Haruhisa Suzuki, all of Toyota; Kouichi Kondou, Toyoake; Keijiro Oshima, Toyota, all of Japan

[73] Assignee: Toyota Jidosha Kabushiki Kaisha, Toyota, Japan

[21] Appl. No.: 08/893,094

[22] Filed: Jul. 15, 1997

[30] Foreign Application Priority Data

Jul. 26, 1996 [JP] Japan .................................. 8-215284
Mar. 21, 1997 [JP] Japan .................................. 9-087728

[51] Int. Cl.$^6$ .................................................. F04B 49/02
[52] U.S. Cl. ............................................................ 417/223
[58] Field of Search .................................. 417/223, 319, 417/16; 74/730

[56] References Cited

U.S. PATENT DOCUMENTS

| | | | |
|---|---|---|---|
| 3,699,351 | 10/1972 | Addie | 290/14 |
| 4,502,350 | 3/1985 | Polak | 74/730 |
| 5,285,111 | 2/1994 | Sherman | 290/4 C |
| 5,474,428 | 12/1995 | Kimura et al. | 417/16 |
| 5,558,175 | 9/1996 | Sherman | 180/65.2 |
| 5,799,744 | 9/1998 | Yamaguchi et al. | 180/65.2 |
| 5,842,951 | 12/1998 | Yasue et al. | 477/149 |

FOREIGN PATENT DOCUMENTS

| | | |
|---|---|---|
| A2-645-271 | 3/1995 | European Pat. Off. . |
| A2-0-716-947 | 6/1996 | European Pat. Off. . |
| 4124479 | 1/1993 | Germany . |
| A1-41-24-479 | 1/1993 | Germany . |
| A-48-49115 | 7/1973 | Japan . |
| A-50-30223 | 3/1975 | Japan . |
| A-8-197962 | 8/1996 | Japan . |
| A-8-324262 | 12/1996 | Japan . |
| A-2-273-323 | 6/1994 | United Kingdom . |

*Primary Examiner*—Charles G. Freay
*Assistant Examiner*—Robert Z. Evora
*Attorney, Agent, or Firm*—Oliff & Berridge, PLC

[57] ABSTRACT

An oil pressure generator 20 includes a drive gear 30, a driven gear 32, and a crescent 34, which constitute a gear pump unit, as well as one-way clutches 36 and 38 that respectively interlock with two rotating shafts 42 and 46 when the rotating shafts 42 and 46 rotate in an identical direction relative to the drive gear 30. In case that both the rotating shafts 42 and 46 rotate in the interlocking direction, the corresponding one-way clutch interlocks with the rotating shaft having a greater revolving speed, thereby driving the drive gear 30. This structure enables the oil pressure generator 20 to produce an oil pressure through rotation of the rotating shaft having a greater revolving speed out of the two rotating shafts 42 and 46.

8 Claims, 8 Drawing Sheets

OIL PRESSURE GENERATOR HAVING AT LEAST TWO COAXIAL ROTATING POWER SOURCES AND POWER OUTPUT APPARATUS

BACKGROUND OF THE INVENTION

1. Field of the Invention

The present invention relates to an oil pressure generator and a power output apparatus. More specifically the present invention pertains to an oil pressure generator for producing an oil pressure by means of rotational power given to an input shaft and a power output apparatus with such an oil pressure generator for outputting power to a drive shaft.

2. Description of the Related Art

Known oil pressure generators mounted on a vehicle are attached either directly or indirectly to a crankshaft of an engine (for example, an internal combustion engine like a gasoline engine or a diesel engine), which is one constituent of a transmission mechanism, for the purpose of feeding a supply of oil to a torque converter, lubricating a planetary gear unit included in the transmission, and supplying a working oil pressure to regulate the oil pressure in the transmission. The known oil pressure generators are driven by part of rotational power output from the engine to the crankshaft. The proposed oil pressure generator is, for example, constructed as a gear pump unit 200 illustrated in FIG. 11, which includes a casing 220, a drive gear 230 connected with the crankshaft, a driven gear 232 engaging with the drive gear 230 for rotation, and a crescent 234 interposed between the drive gear 230 and the driven gear 232. In this known structure, an oil pressure is produced through rotations of the drive gear 230 and the driven gear 232 that are accompanied by rotation of a drive shaft. An oil inflow conduit 224 and an oil outflow conduit 226 are formed in the casing 220.

Hybrid electric vehicles with an engine, a generator, a motor, and a battery mounted thereon have been proposed recently to preserve the environment and efficiently utilize the valuable energy resources. The hybrid electric vehicle can be driven only by the power output from the engine, only by the power output from the motor, or by the powers output from both the engine and the motor. An oil pressure generator is also required for the hybrid electric vehicles, in order to lubricate a gear unit in case that the crankshaft of the engine is linked with a drive shaft connecting with driving wheels via the gear unit, in order to actuate a clutch in case that the crankshaft of the engine is linked with the drive shaft via the clutch, and in order to lubricate a gear unit, such as a speed change gear.

Figure 11:
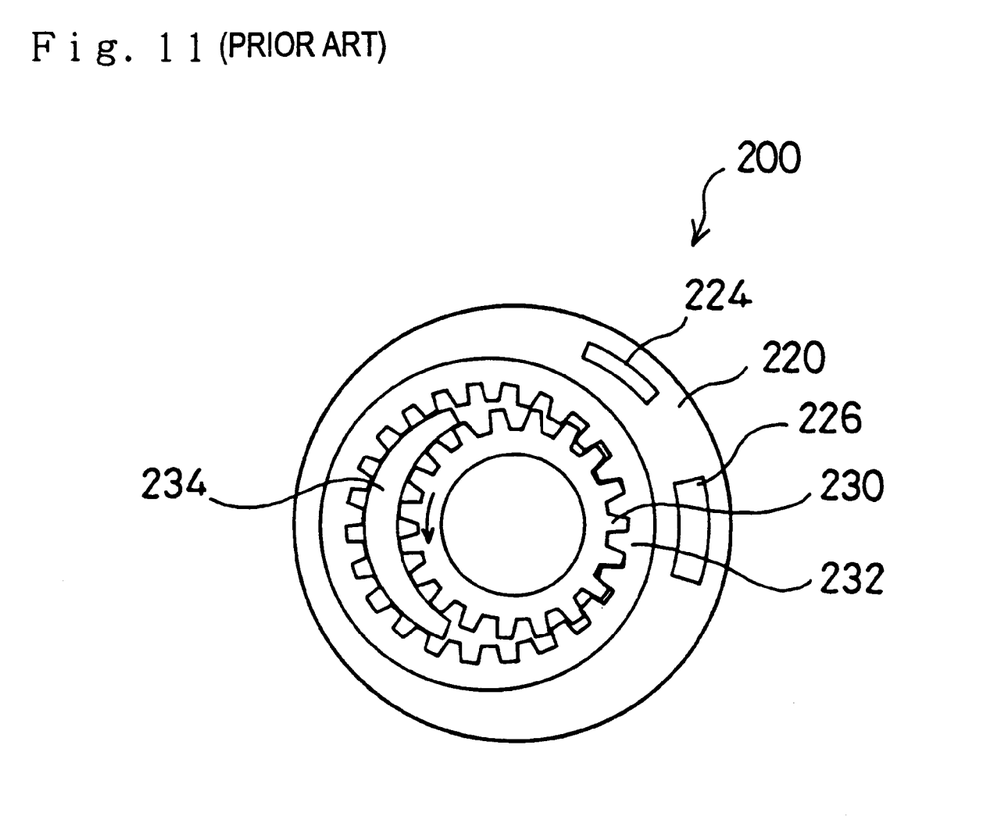
FIG. 11 schematically illustrates structure of a prior art gear pump unit 200.

One possible technique attaches the gear pump unit 200 functioning as an oil pressure generator to the crankshaft of the engine on the hybrid electric vehicle. While the engine is in operation, the oil pressure generator produces an oil pressure. When the vehicle is driven only by the power output from the motor and the engine is at a stop, however, the oil pressure generator does not produce an oil pressure to actuate the clutch or lubricate the gear unit. Another possible technique attaches the gear pump unit 200 to the drive shaft and enables an oil pressure to be produced by rotational power of the drive shaft. In this case, however, the oil pressure generator does not produce an oil pressure while the vehicle is at a stop.

These problems arise not only on the vehicle with the engine and the motor mounted thereon but on any driving systems driven by powers output from two or more power sources.

The applicant of the present invention has proposed the structure of attaching an oil hydraulic pump to the crankshaft of the engine on a hybrid electric vehicle with a gear unit (JAPANESE PATENT LAYING-OPEN GAZETTE No. 50-30223) as well as the structure of attaching oil hydraulic pumps respectively to the crankshaft of the engine and the drive shaft (JAPANESE PATENT LAYING-OPEN GAZETTE No. 48-49115).

SUMMARY OF THE INVENTION

One object of the present invention is to provide an oil pressure generator that selects one among at least two rotational powers as an input power to produce an oil pressure and a power output apparatus with such an oil pressure generator.

Another object of the present invention is to reduce inputs of external turbulence, such as vibrations of an engine, into an oil pressure generator, thereby improving durability and enhancing precision of the oil pressure generator and a power output apparatus with the oil pressure generator.

At least part of the above and other related objects is realized by a first oil pressure generator, the oil pressure generator for producing an oil pressure by means of rotational power given to an input shaft. The first oil pressure generator comprising:

at least two rotating shafts receiving different rotational powers; and selection means for selecting one out of the at least two rotating shafts as the input shaft.

The oil pressure generator of the present invention selects one among at least two rotating shafts as an input axis of power. An oil pressure is accordingly produced by a power output from one power source selected among at least two power sources.

In accordance with one aspect of the first oil pressure generator of the present invention, the selection means of the first oil pressure generator selects a rotating shaft having a greatest revolving speed in a predetermined direction, among the at least two rotating shafts as the input shaft.

This structure enables an oil pressure to be produced by a power input into a rotating shaft having a greatest revolving speed in a predetermined direction.

In accordance with another aspect of the first oil pressure generator of the present invention, the selection means of the first oil pressure generator comprises at least two one-way clutches that are respectively attached to the at least two rotating shafts, each of the one-way clutches transmit the rotational power when corresponding one of the at least two rotating shafts rotates in the predetermined direction, and transmitting no rotational power when the corresponding rotating shaft rotates in a direction opposite to the predetermined direction.

This simplifies the structure of the oil pressure generator that selects a rotating shaft having a greatest revolving speed in a predetermined direction.

At least part of the above and other related objects is realized by a first power output apparatus for outputting power to a drive shaft, the power output apparatus comprising:

an engine having an output shaft;

a first motor having a first revolving shaft and inputting and outputting power to and from the first revolving shaft;

a second motor having a second revolving shaft linked with the drive shaft and inputting and outputting power to and from the second revolving shaft;

three shaft-type power input/output means having three shafts respectively linked with the output shaft of the engine, the first revolving shaft of the first motor, and the second revolving shaft of the second motor, the three shaft-type power input/output means determining power input to and output from a residual one shaft, based on predetermined powers input to and output from any two shafts among the three shafts; and an oil pressure generator comprising: an input shaft to produce an oil pressure, a first rotating shaft connected with the output shaft of the engine, a second rotating shaft connected with the second revolving shaft of the second motor and selection means for selecting one out of the at least two rotating shafts as the input shaft.

In the oil pressure generator of the present invention, at least two rotating shafts selectable as the input axis include a rotating shaft connected to the output shaft of the engine and a rotating shaft connected to the second revolving shaft of the second motor. The oil pressure generator accordingly produces an oil pressure by means of a power output from the engine or a power output from the second motor.

The power output apparatus of the present invention selects either the rotating shaft connected to the output shaft of the engine or the rotating shaft connected to the second revolving shaft of the second motor. This structure enables the oil pressure generator to produce an oil pressure by means of a power output from the engine or a power output from the second motor.

In accordance with one aspect of the first power output apparatus, the oil pressure generator is integrated with the second motor.

In this preferable structure, the oil pressure generator is integrated with the second motor that has a relatively large mass and greater vibration-damping effects. This reduces an external turbulence, such as vibrations of the engine, input into the oil pressure generator, thereby improving the durability and enhancing the precision of the oil pressure generator and the power output apparatus.

In the power output apparatus wherein the oil pressure generator is integrated with the second motor, a clearance may be set between the output shaft of the engine and the rotating shaft of the oil pressure generator connected with the output shaft, in order to absorb lost motion of the rotating shaft. Alternatively a clearance may be set between the second revolving shaft of the second motor and the rotating shaft of the oil pressure generator connected with the second revolving shaft, in order to absorb lost motion of the rotating shaft. Even when an external turbulence, such as unexpected vibrations, occurs on the output shaft of the engine or the second revolving shaft of the second motor, this structure effectively reduces the inputs of external turbulence into the oil pressure generator.

These and other objects, features, aspects, and advantages of the present invention will become more apparent from the following detailed description of the preferred embodiment with the accompanying drawings.

DESCRIPTION OF THE PREFERRED EMBODIMENTS

Figure 1:
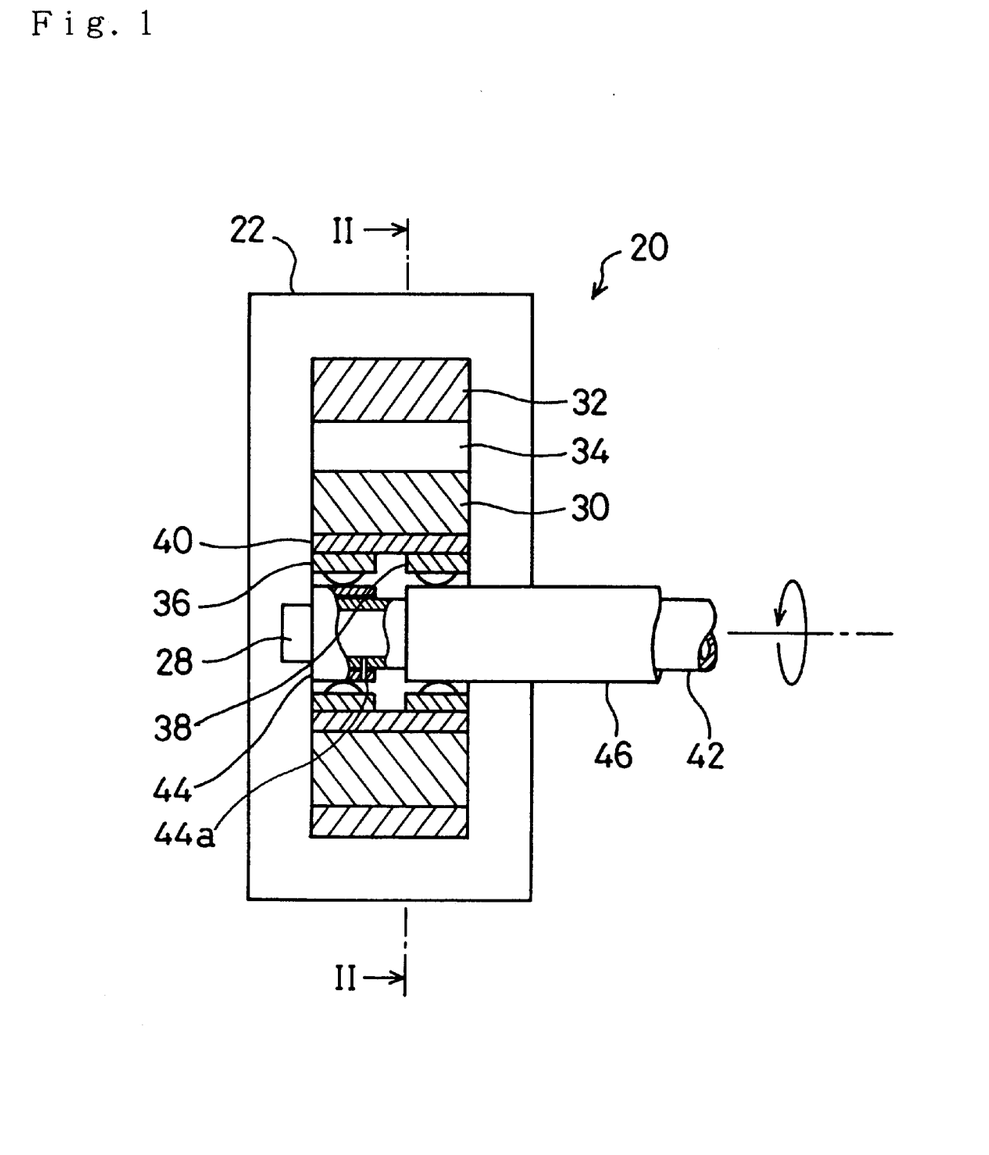
FIG. 1 is a partial cross sectional view schematically illustrating structure of an oil pressure generator 20 embodying the present invention, taken on the line I—I of FIG. 2.
Figure 2:
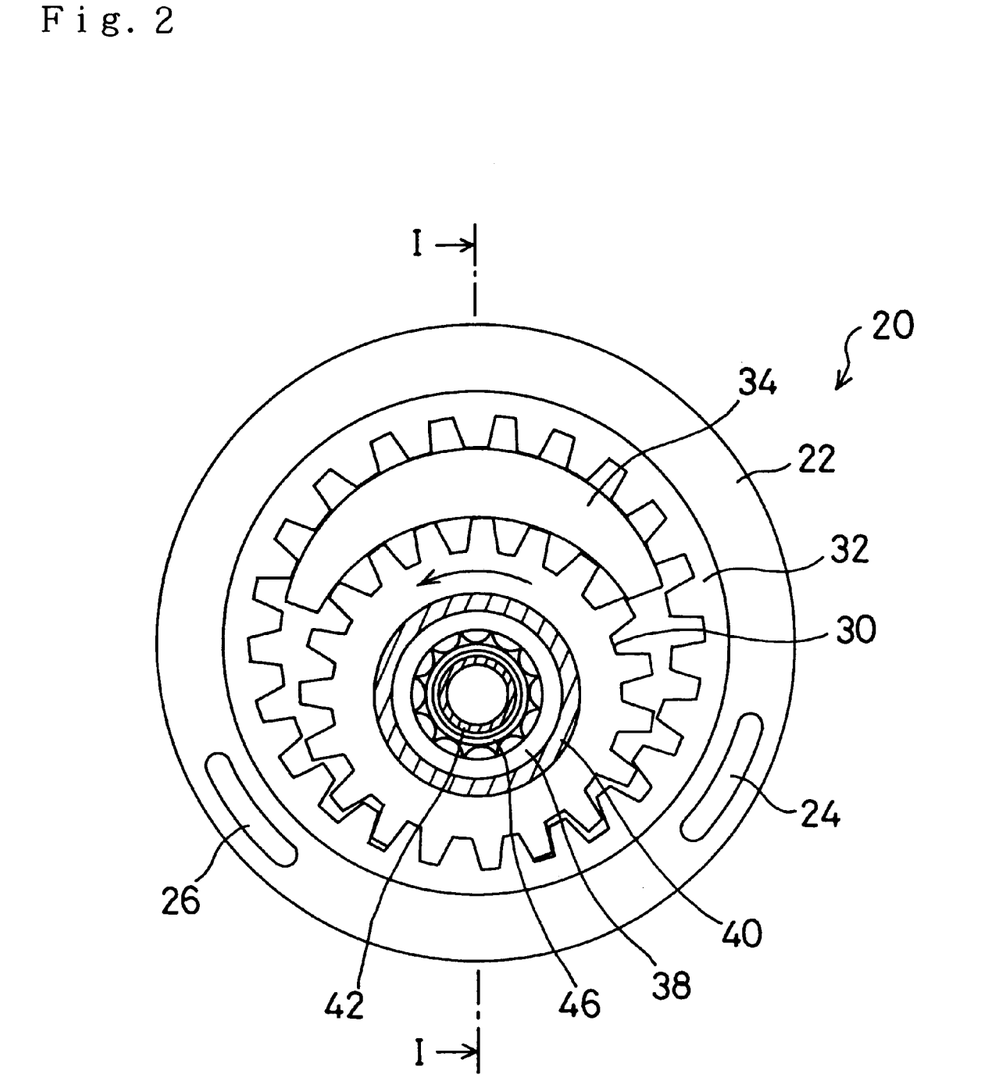
FIG. 2 is a partial cross sectional view illustrating the oil pressure generator 20, taken on the line II—II in FIG. 1.

One mode of carrying out the present invention is discussed below as a preferred embodiment. Referring to FIGS. 1 and 2, the oil pressure generator 20 includes identical constituents to those of the prior art gear pump unit 200 discussed above with the drawing of FIG. 11, that is, a casing 22, a drive gear 30, a driven gear 32 engaging with the drive gear 30 for rotation, and a crescent 34 interposed between the drive gear 30 and the driven gear 32. The oil pressure generator 20 also has a first one-way clutch 36 that interlocks with a hollow first rotating shaft 42 only when the first rotating shaft 42 rotates in a predetermined direction, a second one-way clutch 38 that interlocks with a hollow second rotating shaft 46, which the first rotating shaft 42 rotatably passes through, only when the second rotating shaft 46 rotates in a predetermined direction, and a fixation member 40 for fixing the one-way clutches 36 and 38 to the drive gear 30.

As clearly shown in FIG. 2, the casing 22 has an oil inflow conduit 24, which connects with a clearance between the drive gear 30 and the driven gear 32 located on the lower right side of the crescent 34, and an oil outflow conduit 26, which connects the same clearance located on the lower left side of the crescent 34. The oil outflow conduit 26 connects with an outlet 28 formed in the casing 22 as shown in FIG. 1. Oil is translated under pressure from the outlet 28 into the first rotating shaft 42.

The first one-way clutch 36 interlocks with a circular interlocking member 44 fixed to the periphery of the first rotating shaft 42, in case that the first rotating shaft 42 rotates relative to the drive gear 30 in the direction of the arrow shown in FIG. 1. In this embodiment, the interlocking member 44 is fixed to the first rotating shaft 42 with a fixation pin 44a, while there is a little clearance between the interlocking member 44 and the first rotating shaft 42. The clearance absorbs the lost motion of the first rotating shaft 42 that may result from eccentricity of the first rotating shaft 42 by an external force. The second one-way clutch 38 interlocks with the second rotating shaft 46, in case that the second rotating shaft 46 rotates relative to the drive gear 30 in the direction of the arrow shown in FIG. 1. When both the first rotating shaft 42 and the second rotating shaft 46 rotate in the direction of the arrow of FIG. 1, this configuration enables the corresponding one-way clutch to interlock with the rotating shaft having a higher revolving speed, thereby rotating the drive gear 30. Under such conditions, the other rotating shaft having a lower revolving speed rotates relative to the drive gear 30 in the opposite direction to the arrow shown in FIG. 1. Namely the corresponding one-way clutch is released from this rotating shaft rotating in the opposite direction. The drive gear 30 is thus driven by the rotating shaft that has a greater revolving speed in the direction of the arrow of FIG. 1 out of the two rotating shafts 42 and 46. The oil pressure generator 20 accordingly produces an oil pressure through rotation of the rotating shaft having a greater rotating speed.

As discussed above, the oil pressure generator 20 of the embodiment produces an oil pressure through rotation of the rotating shaft that has a greater revolving speed in a predetermined direction out of the two rotating shafts 42 and 46. As long as either one of the two rotating shafts 42 and 46 rotates in a predetermined direction, the oil pressure generator 20 can produce an oil pressure even when the other rotating shaft stops its rotation. The one-way clutches 36 and 38 have an identical interlocking direction. The selected one of the one-way clutches 36 and 38 thus readily interlocks with the corresponding rotating shaft.

In the oil pressure generator 20 of the embodiment, the first one-way clutch 36 interlocks with the interlocking member 44 that is fixed to the first rotating shaft 42 via a little clearance. The clearance absorbs the lost motion of the first rotating shaft 42 that may result from eccentricity of the first rotating shaft 42 by an external force. This configuration enables the oil pressure generator 20 to have excellent durability and high precision.

Figure 3:
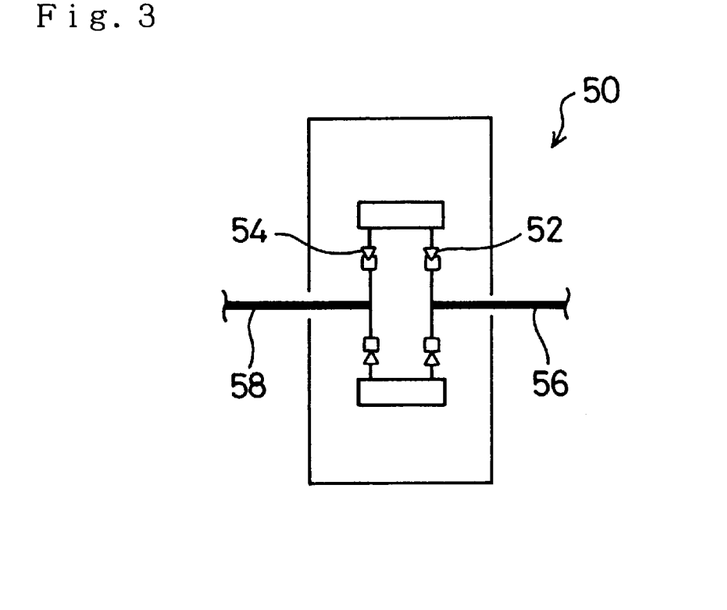
FIG. 3 schematically illustrates structure of a second embodiment of the oil pressure generator 50 as a modified example.

The oil pressure generator 20 of the embodiment is linked with the two rotating shafts 42 and 46, wherein the first rotating shaft 42 rotatably passes through the axial center of the second rotating shaft 46. In accordance with the second embodiment shown in FIG. 3, however, an oil pressure generator 50 is linked with two rotating shafts 56 and 58, which are projected in opposite directions, via one-way clutches 52 and 54. Only the two rotating shafts 56 and 58 and the two one-way clutches 52 and 54 are schematically illustrated in FIG. 3, although the oil pressure generator 50 of the modified structure has the other constituents identical with those of the oil pressure generator 20 of the embodiment.

Figure 4:
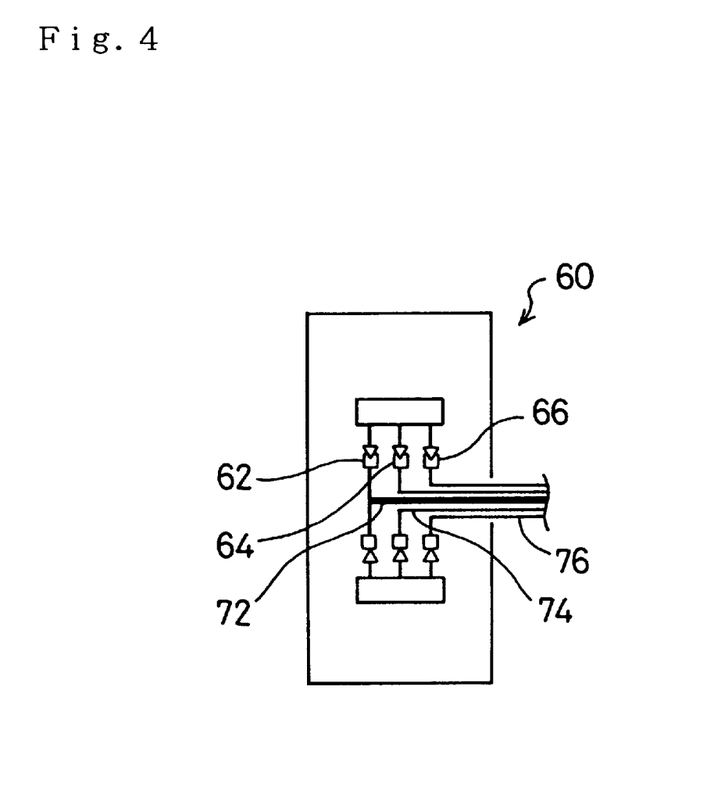
FIG. 4 schematically illustrates structure of a third embodiment of the oil pressure generator 60 as another modified example.

In the oil pressure generator 20 of the embodiment, the two one-way clutches 36 and 38 are arranged to interlock respectively with the two rotating shafts 42 and 46 in a predetermined interlocking direction. In accordance with a third embodiment, three or more one-way clutches are arranged to interlock respectively with three or more rotating shafts in a predetermined interlocking direction. In an oil pressure generator 60 shown in FIG. 4, for example, three one-way clutches 62, 64, and 66 are arranged respectively to interlock with three rotating shafts 72, 74, and 76 in a predetermined interlocking direction. This configuration enables an oil pressure to be produced through rotation of the rotating shaft that has a greatest revolving speed in a predetermined direction among the three or more rotating shafts. Only the three rotating shafts 72, 74, and 76 and the three one-way clutches 62, 64, and 66 included in the oil pressure generator 60 are schematically illustrated in FIG. 4.

In the oil pressure generator 20 of the embodiment, the gear pump unit (including the drive gear 30, the driven gear 32, and the crescent 34) is connected to the two rotating shafts 42 and 46 via the one-way clutches 36 and 38. In accordance with another possible structure, a gear pump unit without the crescent 34 may be connected to the two rotating shafts 42 and 46 via the one-way clutches 36 and 38. As long as the rotating shaft functions as an input axis of power to produce an oil pressure, the oil pressure generator may have any structure other than the gear pump unit.

In the oil pressure generator 20 of the embodiment, the second one-way clutch 38 directly interlocks with the second rotating shaft 46. Like the engagement of the first one-way clutch 36 with the first rotating shaft 42, however, the second one-way clutch 38 may interlock with an interlocking member that is fixed to the second rotating shaft 46 via a little clearance. The clearance absorbs the lost motion of the second rotating shaft 46. This configuration enables the oil pressure generator 20 to have greater durability and higher precision.

In the oil pressure generator 20 of the embodiment, the interlocking member 44 is fixed to the first rotating shaft 42 by means of the fixation pin 44a, as shown in FIG. 1. Fixation may be attained by any other technique as long as a little clearance can be set between the interlocking member 44 and the first rotating shaft 42.

Figure 5:
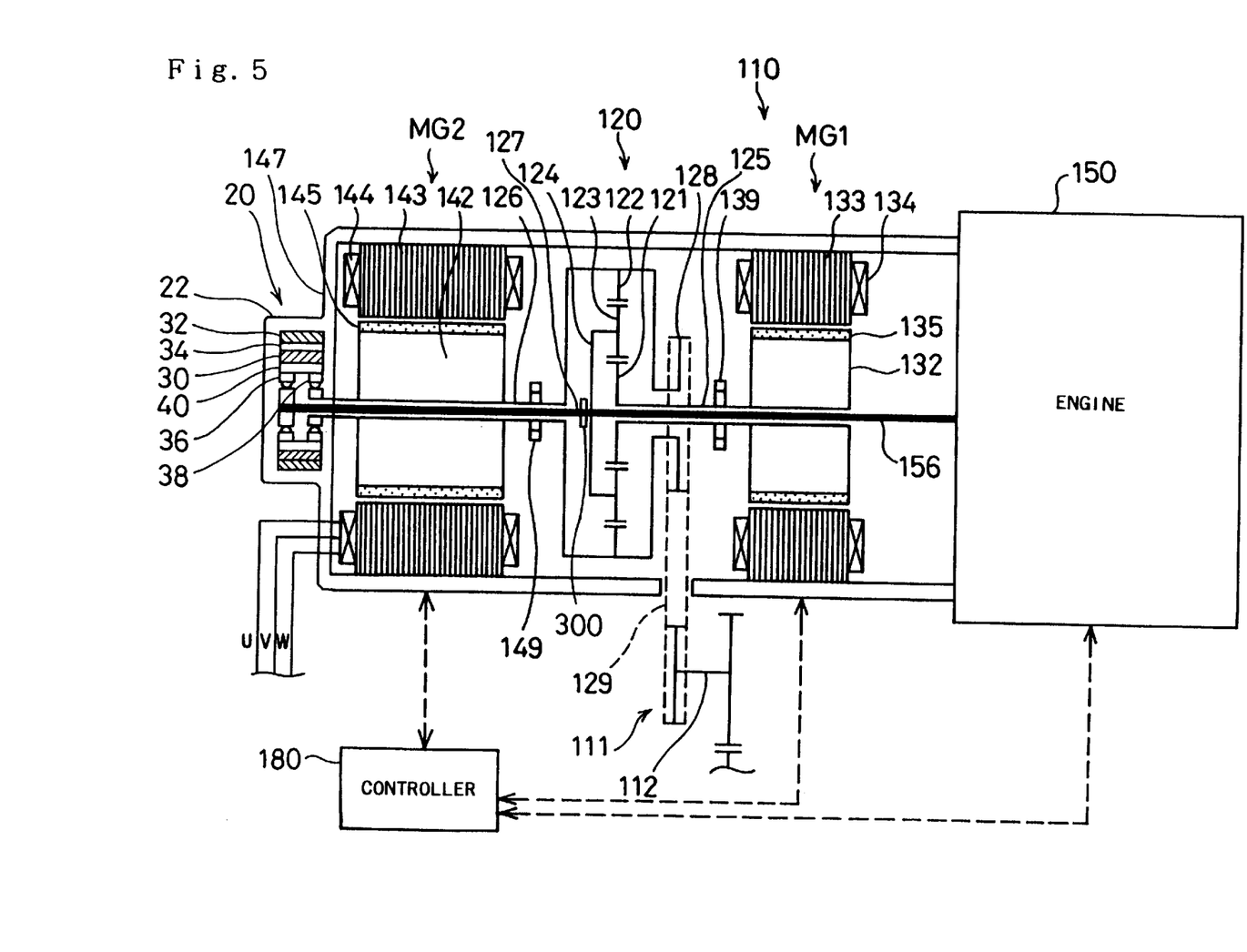
FIG. 5 schematically illustrates structure of a power output apparatus 110 with the oil pressure generator 20 of the embodiment.

The following describes a power output apparatus 110 with the oil pressure generator 20 embodying the present invention. FIG. 5 is a block diagram schematically illustrating structure of the power output apparatus 110 with the oil pressure generator 20.

Referring to FIG. 5, the power output apparatus 110 primarily includes an engine 150, a planetary gear 120 having a planetary carrier 124 mechanically linked with a crankshaft 156 of the engine 150, a first motor MG1 linked with a sun gear 121 of the planetary gear 120, a second motor MG2 linked with a ring gear 122 of the planetary gear 120, a controller 180 for driving and controlling the first and the second motors MG1 and MG2, and the oil pressure generator 20 for feeding a supply of lubricating oil to the planetary gear 120.

The planetary gear 120 includes the sun gear 121 linked with a hollow sun gear shaft 125 that enables the crankshaft 156 to pass through the axial center thereof, the ring gear 122 linked with a hollow ring gear shaft 126 that is coaxial with the crankshaft 156 and enables a carrier shaft 127 to pass through the axial center thereof, as represented by reference number 300 in FIG. 5, plurality of planetary pinion gears 123 arranged between the sun gear 121 and the ring gear 122 to revolve around the sun gear 121 while rotating on its axis, and the planetary carrier 124 connecting with one end of the crankshaft 156 to support the rotating shafts of the planetary pinion gears 123. In the planetary gear 120, three shafts, that is, the sun gear shaft 125, the ring gear shaft 126, and the crankshaft 156 respectively connecting with the sun gear 121, the ring gear 122, and the planetary carrier 124, work as input and output shafts of the power. Determination of the powers input to and output from any two shafts among the three shafts automatically determines the power input to and output from the residual one shaft.

A power feed gear 128 for taking out the power is linked with the ring gear 122 and arranged on the side of the first motor MG1. The power feed gear 128 is further connected to a power transmission gear 111 via a chain belt 129, so that the power is transmitted between the power feed gear 128 and the power transmission gear 111. This configuration enables the power output from the power output apparatus 110 to be taken out of the power transmission gear 111.

Both the first motor MG1 and the second motor MG2 are constructed as synchronous motor-generators. The motor MG1 includes a rotor 132 having a plurality of permanent magnets 135 on its outer surface and a stator 133 having three-phase coils 134 wound thereon to form a revolving magnetic field. The other motor MG2 includes a rotor 142 having a plurality of permanent magnets 145 on its outer surface and a stator 143 having three-phase coils 144 wound thereon to form a revolving magnetic field. The rotor 132 of the first motor MG1 is linked with the sun gear shaft 125 connecting with the sun gear 121 of the planetary gear 120, whereas the rotor 142 of three second motor MG2 is linked with the ring gear shaft 126 connecting with the ring gear 122 of the planetary gear 120. Resolvers 139 and 149 for measuring rotational angles θ1 and θ2 of the rotors 132 and 142 are further attached to the motors MG1 and MG2.

The oil pressure generator 20 is connected to the carrier shaft 127 and the ring gear shaft 126, which are coaxially linked with the planetary carrier 124, via the one-way clutches 36 and 38, respectively. The casing 22 of the oil pressure generator 20 is formed integrally with a case 147, to which the stator 143 of the second motor MG2 is attached. The oil pressure generator 20 included in the power output apparatus 110 has an identical structure to that of the oil pressure generator 20 shown in FIGS. 1 and 2, except that the two rotating shafts 42 and 46 are replaced by the carrier shaft 127 and the ring gear shaft 126 and that the casing 22 is formed integrally with the case 147. The respective constituents of the oil pressure generator 20 are thus not specifically described here. In the power output apparatus 110, the casing 22 of the oil pressure generator 20 is integrated with the case 147, so that the oil pressure generator 20 is regarded as a large mass vibrating with the first motor MG1. This structure effectively damps vibrations due to the operation of the engine 150. The one-way clutch 36 is interlocked with the carrier shaft 127, which is an input axis of the engine 150 causing vibrations, via the interlocking member 44 that is fixed to the carrier shaft 127 across a little clearance. Even when an unexpected vibration of the engine 150 or an external turbulence causes the lost motion of the carrier shaft 127, this structure effectively absorbs the lost motion, thereby reducing inputs, such as an external turbulence, into the oil pressure generator 20.

Although not being illustrated in detail, the controller 180 includes two inverter circuits for generating quasi-sinusoidal currents supplied to the three-phase coils 134 and 144 of the two motors MG1 and MG2, a battery charged and discharged via the two inverter circuits, a motor control CPU for controlling switching operations of the two inverter circuits, and an engine control CPU for controlling operation of the engine 150. The controller 180 controls operations of the first motor MG1, the second motor MG2, and the engine 150, based on input signals from a variety of sensors that measure the conditions of the motors MG1 and MG2 and the engine 150. The control procedure carried out by the controller 180 is not essential for the principle of the present invention and is thus not discussed here.

The following describes typical operations of the power output apparatus 110 thus constructed. It is assumed that the engine 150 is driven at a driving point P1, which is defined by a revolving speed Ne and a torque Te and gives an amount of energy Pe, and that the ring gear shaft 126 is driven at a driving point P2, which is defined by another revolving speed Nr and another torque Tr but gives the same amount of energy as the energy Pe output from the engine 150. In this state, the power output from the engine 150 goes through torque conversion and is applied to the ring gear shaft 126.

Figure 6:
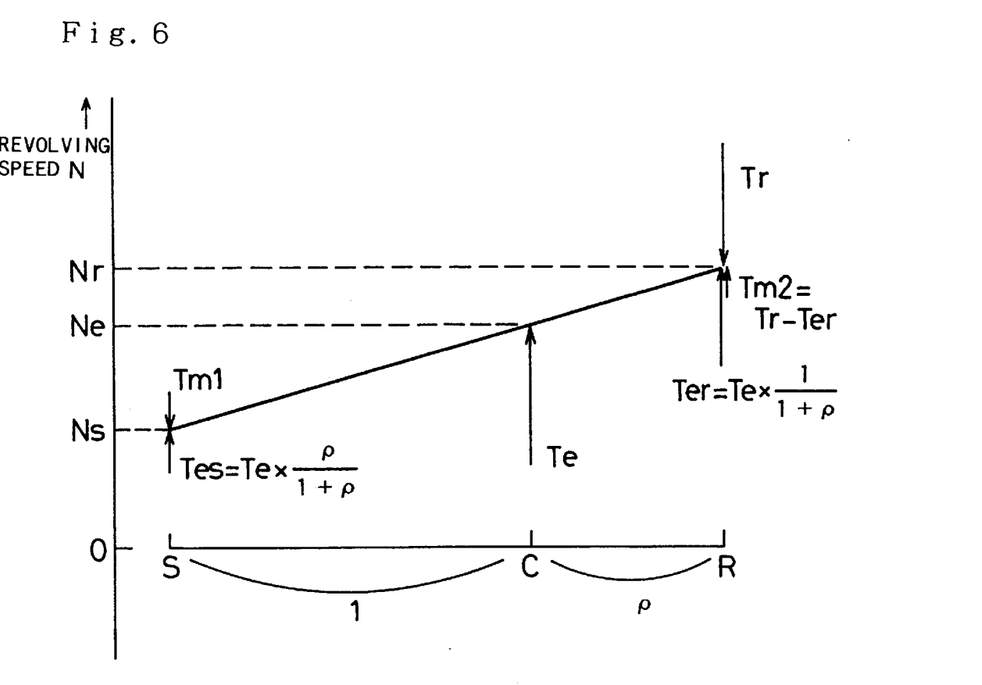
FIG. 6 is a nomogram showing the relationship between the revolving speed and the torque of the three shafts connected to the planetary gear 120.
Figure 7:
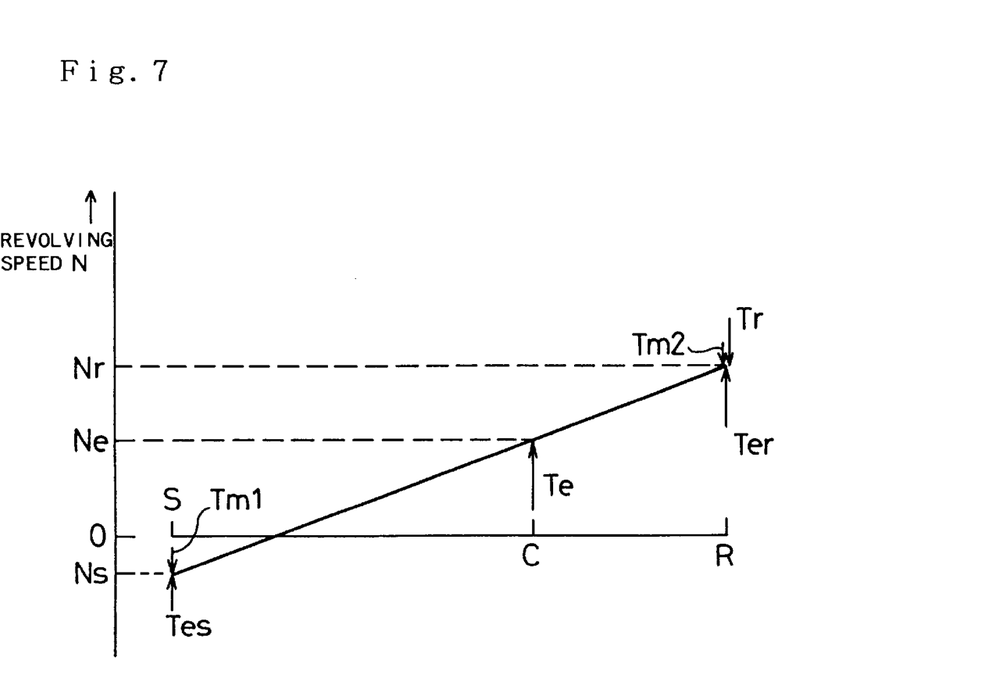
FIG. 7 is a nomogram showing the relationship between the revolving speed and the torque of the three shafts connected to the planetary gear 120.

According to the mechanics, the relationship between the revolving speed and the torque of the three shafts in the planetary gear 120 (that is, the sun gear shaft 125, the ring gear shaft 126, and the planetary carrier 124) can be expressed as nomograms illustrated in FIGS. 6 and 7 and solved geometrically. The relationship between the revolving speed and the torque of the three shafts in the planetary gear 120 may also be analyzed numerically through calculation of energies of the respective shafts, without using the nomograms. For the clarity of explanation, however, the nomograms are used in this embodiment.

In the nomogram of FIG. 6, the revolving speed of the three shafts is plotted as ordinate and the positional ratio of the coordinate axes of the three shafts as abscissa. When a coordinate axis S of the sun gear shaft 125 and a coordinate axis R of the ring gear shaft 126 are positioned on either ends of a line segment, a coordinate axis C of the planetary carrier 124 is given as an interior division of the axes S and R at the ratio of 1 to ρ, where ρ represents the ratio of the number of teeth of the sun gear 121 to the number of teeth of the ring gear 122 and is defined by Equation (1) given below:

$$\rho = \frac{\text{number of teeth of sun gear}}{\text{number of teeth of ring gear}} \quad (1)$$

As mentioned above, the engine 150 is driven at the revolving speed Ne, while the ring gear shaft 126 is driven at the revolving speed Nr. The revolving speed Ne of the engine 150 can thus be plotted on the coordinate axis C of the planetary carrier 124 linked with the crankshaft 156 of the engine 150, and the revolving speed Nr of the ring gear shaft 126 on the coordinate axis R of the ring gear shaft 126. A plane curve passing through both the points is drawn, and a revolving speed Ns of the sun gear shaft 125 is then given as the intersection of this plane curve and the coordinate axis S. Such a plane curve is hereinafter referred to as a dynamic collinear line. The revolving speed Ns of the sun gear shaft 125 can be calculated from the revolving speed Ne of the engine 150 and the revolving speed Nr of the ring gear shaft 126 according to a proportional expression given below (Equation (2)). In the planetary gear 120, determination of the rotations of any two elements among the sun gear 121, the ring gear 122, and the planetary carrier 124 results in automatically specifying the rotation of the residual element.

$$Ns = Nr - (Nr - Ne)\frac{1+\rho}{\rho} \quad (2)$$

The torque Te of the engine 150 is then applied (upward in the drawing) to the dynamic collinear line on the coordinate axis C of the planetary carrier 124 functioning as a line of action. The dynamic collinear line against the torque can be regarded as a rigid body to which a force is applied as a vector. Based on the technique of dividing the force into two parallel lines of action having an identical direction, the torque Te acting on the coordinate axis C is divided into a torque Tes on the coordinate axis S and a torque Ter on the coordinate axis R. The magnitudes of the torques Tes and Ter are given by Equations (3) and (4) below:

$$Tes = Te \times \frac{\rho}{1+\rho} \quad (3)$$

$$Ter = Te \times \frac{1}{1+\rho} \quad (4)$$

The equilibrium of forces on the dynamic collinear line is essential for the stable state of the dynamic collinear line. In accordance with a concrete procedure, a torque Tm1 having the same magnitude as but the opposite direction to the torque Tes is applied to the coordinate axis S, whereas a torque Tm2 having the same magnitude as but the opposite direction to a resultant force of the torque Ter and the torque that has the same magnitude as but the opposite direction to the torque Tr output to the ring gear shaft 126 is applied to the coordinate axis R. The torque Tm1 is given by the first motor MG1, and the torque Tm2 by the second motor MG2. The first motor MG1 applies the torque Tm1 in reverse of its rotation and thereby works as a generator to regenerate an electrical energy Pm1, which is given as the product of the torque Tm1 and the revolving speed Ns, from the sun gear shaft 125. The second motor MG2 applies the torque Tm2 in the direction of its rotation and thereby works as a motor to output an electrical energy Pm2, which is given as the product of the torque Tm2 and the revolving speed Nr, as a power to the ring gear shaft 126.

In case that the electrical energy Pm1 is identical with the electrical energy Pm2, all the electric power consumed by the second motor MG2 can be regenerated and supplied by the first motor MG1. In order to attain such a state, all the input energy should be output; that is, the energy Pe output from the engine 150 should be equal to an energy Pr output to the ring gear shaft 126. Namely the energy Pe expressed as the product of the torque Te and the revolving speed Ne is made equal to the energy Pr expressed as the product of the torque Tr and the revolving speed Nr. As discussed previously, the power output to the ring gear shaft 126 is transmitted to a drive shaft 112 (see FIG. 5) via the power feed gear 128 and the power transmission gear 111, and further transmitted to driving wheels (not shown) via a differential gear (not shown). A linear relationship is accordingly held between the power output to the ring gear shaft 126 and the power transmitted to the driving wheels. The power transmitted to the driving wheels can thus be controlled by adjusting the power output to the ring gear shaft 126.

Although the revolving speed Ns of the sun gear shaft 125 is positive in the nomogram of FIG. 6, it may be negative according to the revolving speed Ne of the engine 150 and the revolving speed Nr of the ring gear shaft 126 as shown in the nomogram of FIG. 7. In the latter case, the first motor MG1 applies the torque in the direction of its rotation and thereby works as a motor to consume the electrical energy Pm1 given as the product of the torque Tm1 and the revolving speed Ns. The second motor MG2, on the other hand, applies the torque in reverse of its rotation and thereby works as a generator to regenerate the electrical energy Pm2, which is given as the product of the torque Tm2 and the revolving speed Nr, from the ring gear shaft 126. In case that the electrical energy Pm1 consumed by the first motor MG1 is made equal to the electrical energy Pm2 regenerated by the second motor MG2 under such conditions, all the electric power consumed by the first motor MG1 can be supplied by the second motor MG2.

In both the states of the nomograms of FIGS. 6 and 7, the revolving speed Nr of the ring gear shaft 126 is greater than the revolving speed Ne of the engine 150 or the revolving speed Nc of the carrier shaft 127. The one-way clutch 38 of the oil pressure generator 20 accordingly interlocks with the ring gear shaft 126, so that rotation of the ring gear shaft 126 drives the drive gear 30 to produce an oil pressure.

Figure 8:
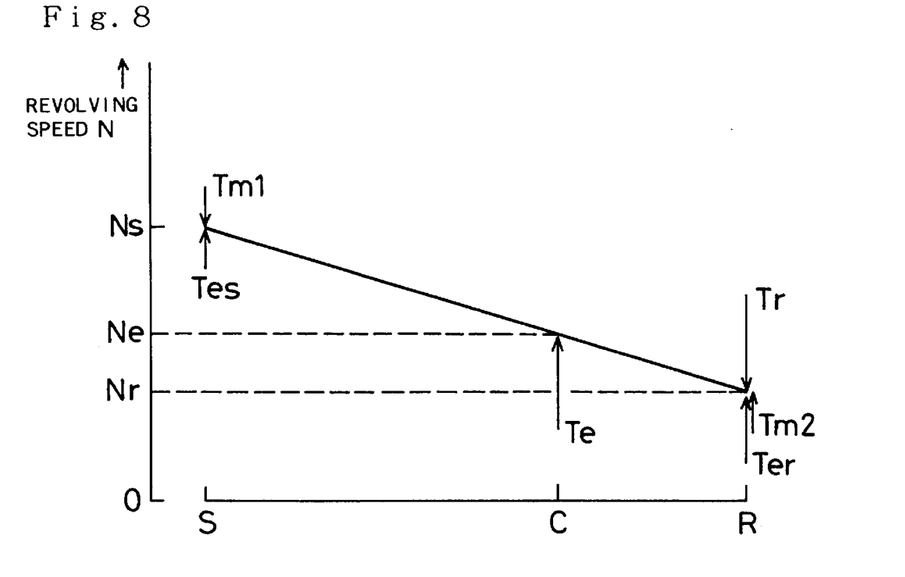
FIG. 8 is a nomogram in the state that the revolving speed Ne of the engine 150 is greater than the revolving speed Nr of the ring gear shaft 126.

In both the states of the nomograms of FIGS. 6 and 7, the engine 150 is driven at the driving point of the revolving speed Ne that is lower than the revolving speed Nr of the ring gear shaft 126. In the power output apparatus 110 of the embodiment, however, the engine 150 may be driven at the driving point of the revolving speed Ne that is higher than the revolving speed Nr of the ring gear shaft 126 as shown in FIG. 8. In this case, the revolving speed Nc of the carrier shaft 127 that is connected to the crankshaft 156 of the engine 150 via the planetary carrier 124 is greater than the revolving speed Nr of the ring gear shaft 126. The one-way clutch 36 of the oil pressure generator 20 accordingly interlocks with the carrier shaft 127, so that rotation of the carrier shaft 127 drives the drive gear 30 to produce an oil pressure.

Figure 9:
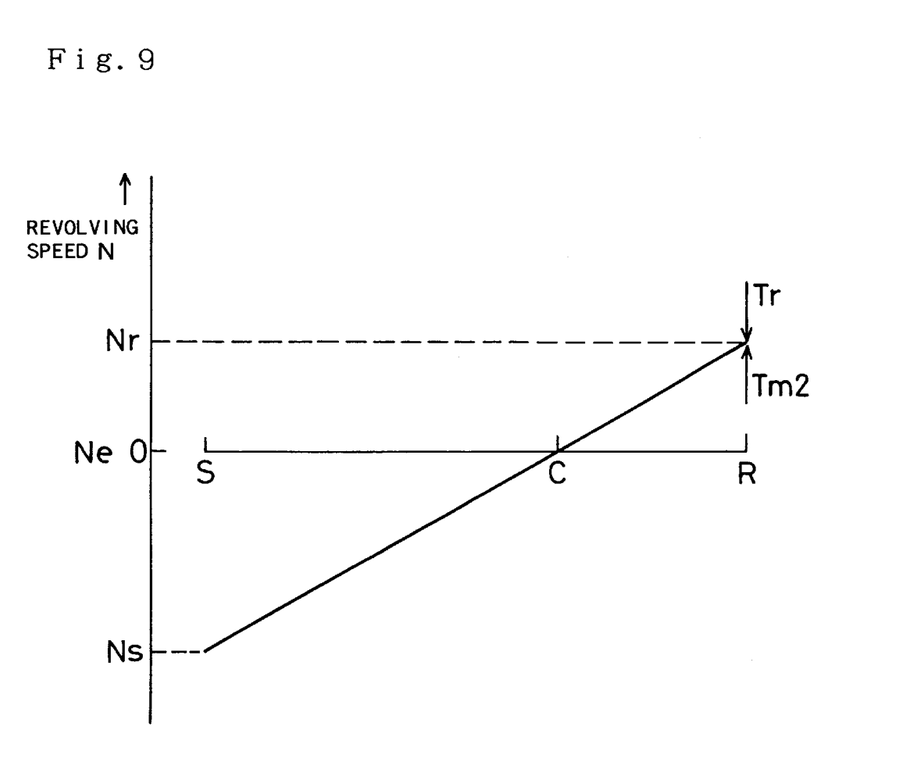
FIG. 9 is a nomogram in the state that the engine 150 is at a stop.

The power output apparatus 110 of the embodiment may be driven only by the second motor MG2, while the engine 150 is at a stop. FIG. 9 shows a nomogram in this state. Since the engine 150 stops its operation, the revolving speed Ne of the engine 150 and the revolving speed Nc of the carrier shaft 127 are both equal to zero. The ring gear shaft 126 is, on the other hand, driven by the second motor MG2. Rotation of the ring gear shaft 126 thus enables the oil pressure generator 20 to produce an oil pressure.

Figure 10:
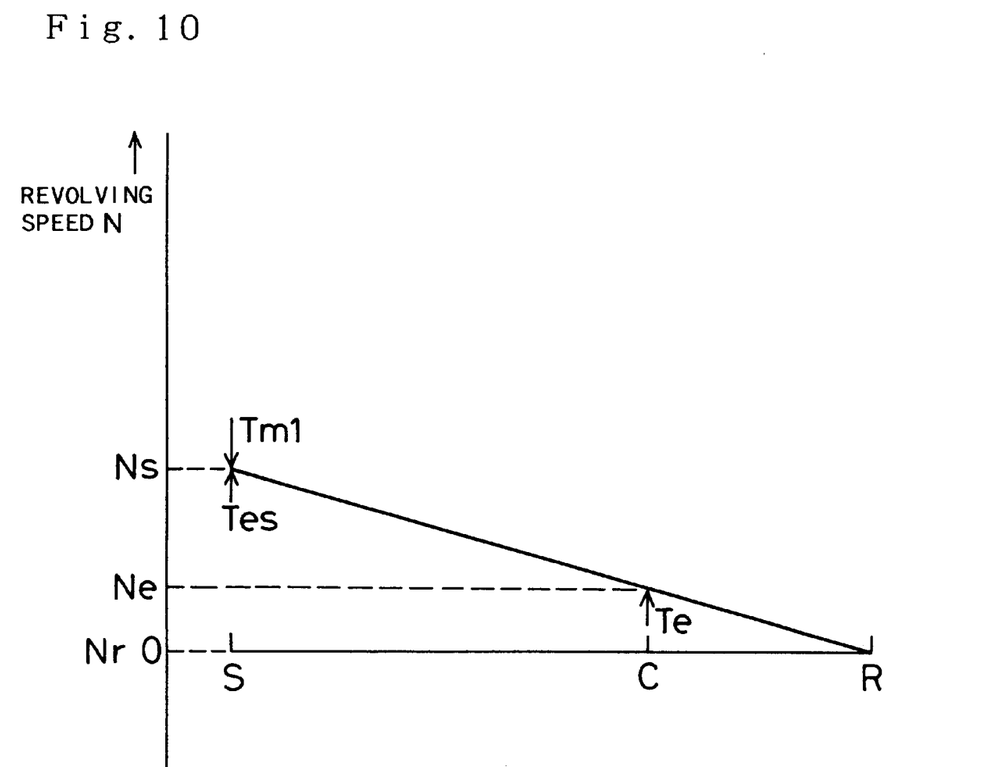
FIG. 10 is a nomogram in the state that the ring gear shaft 126 stops its rotation.

In the power output apparatus 110 of the embodiment, the battery (not shown) included in the controller 180 may be charged with electric power generated by the first motor MG1, while the engine 150 is driven under the ceased condition of the vehicle. FIG. 10 shows a nomogram in this state. When the vehicle is at a stop, the revolving speed Nr of the ring gear shaft 126 is equal to zero. The engine 150 is, on the other hand, driven to enable the oil pressure generator 20 to produce an oil pressure through rotation of the carrier shaft 127 that is connected to the crankshaft 156 of the engine 150.

The power output apparatus 110 of the embodiment includes the oil pressure generator 20 linked with the ring gear shaft 126 and the carrier shaft 127. As long as either one of the ring gear shaft 126 and the carrier shaft 127 rotates, the oil pressure generator 20 can produce an oil pressure. Namely when the engine 150 is driven or the vehicle moves forward, the oil pressure generator 20 can produce an oil pressure. The ring gear shaft 126 and the carrier shaft 127 are connected to one gear pump unit via the one-way clutches 36 and 38. This configuration reduces the size of the power output apparatus 110, compared with the structure having separate gear pump units respectively connected to the ring gear shaft 126 and the carrier shaft 127.

In the power output apparatus 110 of the embodiment, the casing 22 of the oil pressure generator 20 is integrated with the case 147, to which the stator 143 of the second motor MG2 is attached. The oil pressure generator 20 is accordingly regarded as a large mass vibrating with the second motor MG2. This structure effectively damps vibrations due to the operation of the engine 150. The one-way clutch 36 is interlocked with the carrier shaft 127, which is an input axis of the engine 150 causing vibrations, via the interlocking member 44 that is fixed to the carrier shaft 127 across a little clearance. Even when an unexpected vibration of the engine 150 or an external turbulence causes the lost motion of the carrier shaft 127, this structure effectively absorbs the lost motion, thereby reducing inputs, such as an external turbulence, into the oil pressure generator 20.

In the power output apparatus 110 of the embodiment, the one-way clutch 38 directly interlocks with the ring gear shaft 126. Like the engagement of the one-way clutch 36 with the carrier shaft 127, however, the one-way clutch 38 may interlock with an interlocking member that is fixed to ring gear shaft 126 via a little clearance. The clearance absorbs the lost motion of the ring gear shaft 126. This configuration enables the oil pressure generator 20 and thereby the power output apparatus 110 to have greater durability and higher precision.

In the above embodiment, the oil pressure generator 20 is attached to the power output apparatus 110 having the engine 150, the planetary gear 120, the first motor MG1, and the second motor MG2. The oil pressure generator 20 may, however, be attached to any power output apparatus that can be driven by an engine and by a motor.

The present invention is not restricted to the above embodiment, but there may be many modifications, changes, and alterations without departing from the scope or spirit of the main characteristics of the present invention. Although the power output apparatus is mounted on the vehicle in the above embodiment, for example, it may be mounted on other transportation means like ships and airplanes as well as a variety of industrial machines.

It should be clearly understood that the above embodiment is only illustrative and not restrictive in any sense. The scope and spirit of the present invention are limited only by the terms of the appended claims.

What is claimed is:

1. An oil pressure generator for producing an oil pressure by a rotational power given to an input shaft, said oil pressure generator comprising:

at least two coaxial rotating shafts receiving different rotational powers; and selection means for selecting one of said at least two coaxial rotating shafts as said input shafts, wherein said input shaft has an opening at a center of said input shaft and said selection means comprises at least two one-way clutches that are provided in said opening and are respectively attached to said at least two coaxial rotating shafts, each of said one-way clutches transmitting the rotational power when a corresponding one of said at least two coaxial rotating shafts rotates in said predetermined direction, and transmitting no rotational power when said corresponding one of said at least two coaxial rotating shafts rotates in a direction opposite to said predetermined direction.

2. The oil pressure generator in accordance with claim 1, wherein said input shaft and said at least two coaxial rotating shafts are coaxial.

3. A power output apparatus for outputting power to a drive shaft, said power output apparatus comprising:

an engine having an output shaft;

a first motor having a first revolving shaft coaxial with said output shaft, said first motor inputting and outputting power to and from said first revolving shaft;

a second motor having a second revolving shaft linked with said drive shaft and coaxial with said first revolving shaft and said output shaft, said second motor inputting and outputting power to and from said second revolving shaft;

a planetary gear respectively linked with said output shaft of said engine, said first revolving shaft of said first motor, and said second revolving shaft of said second motor, said planetary gear determines power input to an output from a residual one shaft, based on predetermined powers input to and output from any two shafts of said output shaft, said first revolving shaft, and said second revolving shaft; and an oil pressure generator comprising: an input shaft to produce an oil pressure, a rotating shaft connected with said output shaft of said engine and coaxial with said second revolving shaft, and selection means for selecting one of said rotating shaft and said second revolving shaft as said input shaft.

4. The power output apparatus in accordance with claim 3, wherein said oil pressure generator is integrated with said second motor.

5. The power output apparatus in accordance with claim 4, wherein a clearance is set between said output shaft of said engine and said second revolving shaft to absorb lost motion of said rotating shaft.

6. The power output apparatus in accordance with claim 4, wherein a clearance is set between said second revolving shaft and said rotating shaft to absorb lost motion of said rotating shaft.

7. The power output apparatus in accordance with claim 3, wherein said selection means selects one of said rotating shaft and said second revolving shaft having a larger revolving speed in a predetermined direction as said input shaft.

8. The power output apparatus in accordance with claim 7, wherein said selection means comprises at least two one-way clutches that are respectively attached to said rotating shaft and said second revolving shaft, each of said one-way clutches transmits the rotational power when one of said rotating shaft and said second revolving shaft rotates in said predetermined direction, and transmitting no rotational power when said one of said rotating shaft and said second revolving shaft rotates in a direction opposite to said predetermined direction.

* * * * *